— --

United States Patent Office 3,338,925
Patented Aug. 29, 1967

---

3,338,925
17-SUBSTITUTED 14β-ESTR-4-ENES
John H. Fried, Palo Alto, Calif., assignor to Syntex Corporation, Panama, Panama, a corporation of Panama
No Drawing. Filed Oct. 25, 1965, Ser. No. 505,194
14 Claims. (Cl. 260—397.4)

The present invention is directed at cyclopentanopolyhydrophenanthrene derivatives, specifically to 14β-estr-4-enes of the formula:

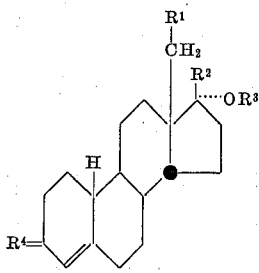

wherein $R^1$ is hydrogen or methyl;
$R^2$ is hydrogen, (lower)alkyl, (lower)alkenyl, (lower)alkynyl, halo(lower)alkynyl or cyclopropyl;
$R^3$ is hydrogen, tetrahydropyranyl or a hydrocarbon carboxylic acyl group of less than 12 carbon atoms; and
$R^4$ is an oxygen atom or the group

in which $R^5$ is hydrogen, tetrahydropyranyl or a hydrocarbon carboxylic acyl group of less than 12 carbon atoms.

By the term "(lower)alkyl," and derivations thereof such as "(lower)alkenyl" and "(lower)alkynyl" is intended a branched or straight chain hydrocarbon group of six or less carbon atoms. In the case of olefinic groups, such will contain at least two carbon atoms. Representations of such (lower)alkyl groups are thus methyl, ethyl, propyl, butyl, pentyl and hexyl; of such (lower)alkynyl groups are vinyl, propargyl and the like; and of such (lower)alkynyl groups are ethynyl, propynyl and the like.

The hydrocarbon carboxylic acyl and acyloxy groups of the present invention will contain less than 12 carbon atoms and may be of a straight, branched, cyclic or cyclic-aliphatic chain structure. These may be saturated, unsaturated or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate and the like.

The compounds of this invention demonstrate hormonal properties, primarily androgenic activity, associated with anabolic activity. Certain of these derivatives, most notably those wherein $R^2$ is ethynyl or chloroethynyl, possess progestational activity and are useful in the control of fertility.

In the synthesis of the 14β-estr-4-enes, a 3-methoxy-18-methyl-14β-estra-1,3,5(10)-trien-17-one or 3 - methoxy-14β-estra-1,3,5(10)-trien-17-one is utilized as the starting material. The preparation of these starting materials is in part the subject matter of copending application Ser. No. 505,191, filed Oct. 25, 1965, and is described in detail therein.

According to the present invention, these starting materials are reduced with sodium or lithium in liquid ammonia to yield 3-methoxy-18-methyl-14β-estra - 2,5(10)-dien-17α-ol and 3-methoxy-14β-estra-2,5(10)-dien-17α-ol respectively. These compounds may be treated with acid, such as methanolic hydrochloric acid, to effect hydrolytic rearrangement, thus generating 17α-hydroxy-18-methyl-14β-estr-4-en-3-one and 17α-hydroxy-14β-estr-4-en - 3-one, respectively.

Alternatively the 3-methoxy-18-methyl-14β-estra - 2,5(10)-dien-17α-ol or 3-methoxy-14β-estra-2,5(10) - dien-17α-ol or 3-methoxy-14β-estra-2,5(10)-dien-17α - ol are oxidized, as by an Oppenauer oxidation, to yield 3-methoxy-18-methyl-14β-estra-2,5(10)-dien-17-one or 3 - methoxy-14β-estra-2,5(10)-dien-17-one respectively. These 17-keto intermediates are then ethynylated in the 17β-position through the action of lithium acetylide or may be substituted in the use of the appropriate Grignard reagents, e.g., methylmagnesium bromide, ethynylmagnesium bromide or the like. 17β-alkenyl derivatives, such as vinyl compounds, are preferably obtained from the corresponding 17β-alkynyl compound through controlled hydrogenation. Upon further hydrogenation, the corresponding 7β-alkyl derivative is obtained. 17β-cyclopropyl derivatives are obtained from the corresponding 17β-vinyl intermediate via the action of methylene iodide and zinc-copper couple.

After introduction and elaboration of 17β-substituents, the 3-methoxy-$\Delta^{2,5(10)}$ A-ring system is hydrolyzed and rearranged through treatment with acid, as previously described, to yield the corresponding 3-keto-$\Delta^4$-system. Use of a weak acid alternatively yields the 3-keto-$\Delta^{5(10)}$-system which is substantially equivalent in this particular class of compounds.

Esterification of a secondary 17α-hydroxy group is accomplished in the usual manner with an acylation agent such as acetic anhydride or caproic anhydride. Tertiary 17α-hydroxy groups are similarly esterified with an acylating agent in the presence of the corresponding acid and a strong acid such as p-toluenesulfonic acid.

Formation of 17α-tetrahydropyranyloxy ethers is realized through the action of dihydropyran on the free 17α-hydroxy group in the presence of an acid such as p-toluenesulfonic acid.

Reduction of a 3-keto-14β-estr-4-ene of the present invention, as with sodium borohydride or lithium aluminum hydride in tetrahydrofuran yields the corresponding 3β-hydroxy-14β-estr-4-ene which may be acylated as with an acid anhydride in pyridine or alternatively converted to the 3β-tetrahydropyranyl ether with dihydropyran in the presence of an acid.

The following examples will serve to further typify the nature of this invention but should not be construed as a limitation on the scope thereof.

*Example 1*

A mixture of 8 g. of 3-methoxy-18-methylestra-1,3,5-(10)-trien-17-one, 10 ml. of ethyl orthoformate, 5 ml. of ethylene glycol and 300 mg. of p-toluenesulfonic acid is refluxed under nitrogen for two hours and then poured into methylene chloride. The organic solution is washed with aqueous sodium bicarbonate solution, dried, treated with 0.5 ml. of pyridine and concentrated in vacuo. The resultant oil is triturated with petroleum ether and allowed to solidify to yield 3-methoxy-17,17-ethylenedioxy-18-methylestra-1,3,5(10)-triene. To a solution of this material (5.66 g.) in 250 ml. of tetrahydrofuran are added 1 equivalent (5.45 g.) of pyridine hydrobromide perbromide. After stirring for 2½ hours at room temperature, 50 ml. of aqueous sodium bicarbonate solution and 500 ml. of water are added. The solution is extracted with methylene chloride and these extracts are then dried over sodium sulfate and evaporated to yield the 16-bromo intermediate. This compound is dissolved in dry xylene and refluxed under nitrogen for 22 hours with 7.5 g. of potassium t-butoxide (obtained by adding 2.62 g. of potassium metal to t-butanol). The mixture is poured into water and extracted with methylene chloride. These extracts are washed with water, dried over sodium sulfate, and evaporated to dryness. The residue is combined with 130 ml. of methanol and 7.2 ml. of 2 N hydrochloric acid and this mixture is refluxed under nitrogen for 5 hours. The solution is then diluted with methylene chloride, washed with dilute aqueous sodium bicarbonate solution, dried over sodium sulfate and evaporated in vacuo. The residue is dissolved in petroleum ether containing a little benzene and chromatographed on silica, eluting with 1:9 ethyl ether:petroleum ether to yield 3-methoxy-18-methylestra-1,3,5(10),14-tetraen-17-one. This material is dissolved in 25 ml. of ethyl acetate and hydrogenated in the presence of 7 g. of prereduced 10% palladium-on-charcoal in 475 ml. of ethyl acetate, at room temperature and atmospheric pressure. The hydrogenation is continued until the theoretical amount of hydrogen is absorbed and the catalyst is then removed by filtration, washing the solid well with methylene chloride. The combined washings and filtrates are then evaporated to yield 3-methoxy-18-methyl-14β-estra-1,3,5(10)-trien-17-one which may be further purified through recrystallization from acetone:petroleum ether.

In a similar fashion from 3-methoxyestra-1,3,5(10)-trien-17-one, there is obtained 3-methoxy-14β-estra-1,3,-5(10)-trien-17-one.

Alternatively these compounds may be obtained through treatment of the 17-keto starting material with isopropenyl acetate and p-toluenesulfonic acid to yield the $\Delta^{16}$-ene-17-acetate. Upon treatment of this enol acetate with chlorine or bromine, the corresponding 16-chloro-17-keto or 16-bromo-17-keto compound is obtained. Upon prolonged refluxing of a mixture of either of these compounds, ethylene glycol and p-toluenesulfonic acid or dinitrobenzenesulfonic acid in toluene, the 16-chloro- or 16-bromo-17,17-ethylenedioxy intermediate is obtained which may be dehydrohalogenated and hydrogenated as previously described.

Example 2

One gram of 3-methoxy-18-methyl-14β-estra-1,3,5(10)-trien-17-one is suspended in 30 ml. of t-butanol, 30 ml. of tetrahydrofuran and 150 ml. of liquid ammonia. Sodium metal is then added until the reaction mixture acquires a blue color and this color is maintained for 7 hours by the addition of sodium as necessary. At the end of this time, sufficient methanol is added to discharge the blue color and the ammonia is then removed through evaporation. After the cautious addition of water, the solution is extracted under nitrogen with methylene chloride. The extracts thus obtained are washed with water, dried over sodium sulfate, and evaporated to dryness to yield 3-methoxy-18-methyl-14β-estra-2,5(10)-dien-17α-ol.

A solution of 2.3 g. of 3-methoxy-18-methyl-14β-estra-2,5(10)-dien-17α-ol in 60 ml. of toluene and 60 ml. of cyclohexanone is dried by removing 15 ml. of solvent by distillation. A solution of 1.65 g. of aluminum isopropoxide in 7 ml. of anhydrous toluene is then added and the mixture refluxed for 8 hours. The mixture is diluted with water and extracted with ethers. These extracts are evaporated and the residue is diluted with water, flushed with nitrogen and distilled. The residue is extracted several times with methylene chloride and these extracts, after washing with water and drying over sodium sulfate, are evaporated to dryness to yield 3-methoxy-18-methyl-14β-estra-2,5(10)-dien-17-one.

Example 3

A stream of dry, acetone-free acetylene is introduced under nitrogen into a cooled mixture of dry tetrahydrofuran and 88 ml. of a 15.1% solution of n-butyl lithium in hexane. One gram of 3-methoxy-18-methyl-14β-estra-2,5(10)-dien-17-one, dissolved in a small amount of tetrahydrofuran is then added. After the mixture has stood at room temperature for 24 hours, one-half the above quantity of lithium acetylide, prepared in the same fashion is added. This mixture is allowed to stand at room temperature for a further 24 hours and is then cautiously poured into a stirred ice-water mixture. This is extracted with methylene chloride and the extracts in turn are washed with water, dried and evaporated to dryness. The residue is chromatographed on silica using 5% isopropyl alcohol in chloroform to yield 3-methoxy-17β-ethynyl-18-methyl-14β-estra-2,5(10)-dien-17α-ol.

One gram of 3-methoxy-17β-ethynyl-18-methyl-14β-estra-2,5(10)-dien-17α-ol in 25 ml. of methanol and 4 ml. of 2 N aqueous hydrochloric acid is heated at reflux for 30 minutes under nitrogen. At the end of this time, the cooled reaction mixture is neutralized with sodium bicarbonate and extracted with methylene chloride. These extracts are washed with water, dried over sodium sulfate and evaporated to yield 17α-hydroxy-17β-ethynyl-18-methyl-14β-estr-4-en-3-one.

By utilizing 3-methoxy-14β-estra-2,5(10)-dien-17-one in the procedure of this example, there is obtained 17α-hydroxy-17β-ethynyl-14β-estr-4-en-3-one as the final compound.

By employing oxalic acid in the foregoing procedure, the corresponding 14β-estr-5(10)-enes are obtained.

Example 4

A solution of 5 g. of 3-methoxy-18-methyl-14β-estra-2,5(10)-dien-17-one in 250 ml. of thiophene-free benzene is treated with 27.5 ml. of 4 N methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 3-methoxy-17β,18-dimethyl-14β-estra-2,5(10)-dien-17α-ol, which is recrystallized from methylene chloride:hexane. By refluxing this compound in methanolic hydrochloric acid as described in Example 3, there is obtained 17α-hydroxy-17β,18-dimethyl-14β-estra-4-en-3-one.

Likewise by subjecting 3-methoxy-14β-estra-2,5(10)-dien-17-one to the procedure of this example, there is obtained 17α-hydroxy-17β-methyl-14β-estr-4-en-3-one.

Example 5

A solution of 8.5 g. of 1,2-dichloroethylene in 50 ml. of anhydrous ether is added in a dropwise fashion, under nitrogen and at 0° C. over a 30 minute period to a stirred solution of 15 ml. of 1.4 N methyl lithium in anhydrous ether. After stirring for an additional 90 minutes at room temperature, a solution of 0.5 g. of 3-methoxy-18-methyl-14β-estra-2,5(10)-dien-17-one in 20 ml. of anhydrous ether is added in a dropwise fashion with stirring over a 15 minute period. Stirring at room temperature is continued for 18 hours, and the reaction mixture is then poured into ice water and extracted with ether. These extracts are washed with water, dried over sodium sulfate and concentrated under reduced pressure. The residue is chromatographed on alkaline alumina with 8:2 hexane: ether to yield 3-methoxy-17β-chloroethynyl-18-methyl-14β-estra-2,5(10)-dien-17α-ol, which may be recrystallized from methanol. This compound is hydrolytically rearranged with methanolic hydrochloric acid as described in Example 3 to yield 17α-hydroxy-17β-chloroethynyl-18-methyl-14β-estr-4-en-3-one.

17α-hydroxy-17β-chloroethynyl-14β-estr-4-en-3-one is obtained in the same manner from the analogous starting material.

Example 6

A solution of 1 g. of 17α-hydroxy-17β-ethynyl-18-methyl-14β-estr-4-en-3-one in 40 ml. of ethylacetate is hydrogenated at 25° C. atmospheric pressure in the presence of 0.4 g. of prehydrogenated 2% palladium-on-calcium carbonate. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure, dried and evaporated to dryness to yield 17α-hydroxy-17β-vinyl-18-methyl-14β-estr-4-en-3-one which is further purified through recrystallization from acetone.

Likewise 17α-hydroxy-17β-vinyl-14β-estr-4-en-3-one is obtained in the same fashion from the corresponding 17β-ethynyl compound.

A suspension of 0.5 g. of 5% palladium-on-carbon catalyst in 50 ml. of methanol is hydrogenated for 30 minutes. A solution of 2 g. of 17α-hydroxy-17β-vinyl-18-methyl-14β-estr-4-en-3-one in 200 ml. of methanol is added and hydrogenated with agitation until the uptake of hydrogen has ceased. The catalyst is removed by filtration and the solution was evaporated to yield 17α-hydroxy-17β-ethyl-18-methyl-14β-estr-4-en-3-one which is recrystallized from methylene chloride:hexane for further purification.

In a similar fashion 17α-hydroxy-17β-ethyl-14β-estr-4-en-3-one is obtained from the corresponding 17β-vinyl derivative.

*Example 7*

A mixture of 7 g. of methylene iodide and 3 g. of zinc-copper couple in 15 ml. of anhydrous ether is heated at reflux under nitrogen for 3 hours. The mixture is then cooled and 2 g. of 17α-hydroxy-17β-vinyl-18-methyl-14β-estr-4-en-3-one are added. The mixture is allowed to stand at room temperature for 2 hours and is then poured into 200 ml. of 2% aqueous sodium carbonate and extracted twice with 100 ml. portions of ether. These extracts are dried over sodium sulfate and evaporated under reduced pressure. The residue is held at 0.01 mm. to remove any unreacted methylene iodide and then recrystallized from hexane to yield 17α-hydroxy-17β-cyclopropyl-18-methyl-14β-estr-4-en-3-one.

By utilizing the appropriate 17β-vinyl starting material in the foregoing procedure, there is similarly obtained 17α-hydroxy-17β-cyclopropyl-14β-estr-4-en-3-one.

*Example 8*

A mixture of 1 g. of 17α-hydroxy-18-methyl-14β-estr-4-en-3-one, obtained upon treating 3-methoxy-18-methyl-14β-estra-2,5(10)-dien-17α-ol with methanolic hydrochloric acid as described in Example 3, 4 ml. of pyridine and 2 ml. of acetic anhydride is allowed to stand at room temperature for 15 hours. The mixture is then poured into ice water and the solid which forms is collected by filtration, washed with water and dried to yield 17α-acetoxy-18-methyl-14β-estr-4-en-3-one which may be further purified through recrystallization from acetone:hexane.

17α-acetoxy-14β-estr-4-en-3-one is obtained in the same fashion from the analogous starting material.

*Example 9*

A mixture of 2 g. of 17α-hydroxy-18-methyl-14β-estr-4-en-3-one in 8 ml. of pyridine and 4 ml. of adamantoyl chloride is allowed to stand at room temperature overnight. The mixture is then poured into ice water and the solid which forms is collected by filtration, washed with water and dried to yield 17α-adamantoyloxy-18-methyl-14β-estr-4-en-3-one which is further purified through recrystallization from methylene chloride:hexane.

*Example 10*

A mixture of 1 g. of 17α - hydroxy-17β-ethynyl-18-methyl-14β-estr-4-en-3-one, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 17α-acetoxy-17β-ethynyl-18-methyl-14β-estr-4-en-3-one which is recrystallized from acetone:ether.

17α - acetoxy - 17β - ethnyl-14β-estr-4-en-3-one is obtained in a similar fashion from the corresponding 17α-hydroxy compound.

*Example 11*

Two milliliters of dihydropyran are added to a solution of 1 g. of 17α-hydroxy-17β-ethynyl-18-methyl-14β-estr-4-en-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 17α - tetrahydropyranyloxy-17β-ethynyl-18-methyl-14β-estr-4-en-3-one which is recrystallized from pentane.

In a similar fashion the following representative compounds are obtained from the corresponding free 17α-hydroxy compounds via the procedure of this example: 17α - tetrahydropyranyloxy - 17β - ethynyl-14β-estr-en-3-one; 17α-tetrahydropyranyloxy-18-methyl - 14β - estr-4-en-3-one; and 17α-tetrahydropyranyloxy-14β-estr-4-en-3-one.

*Example 12*

A solution of 1 g. of sodium borohydride in 3 ml. of water is added to an ice-cooled solution of 1 g. of 17α-hydroxy-17β-ethynyl - 18 - methyl - 14β - estr-4-en-3-one in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3β-17α-dihydroxy - 17β-ethynyl - 18 - methyl-14β-estr-4-ene which may be further purified by recrystallization from acetone:hexane.

In a like manner from 17α-hydroxy-17β-ethynyl-14β-estra-4-en-3-one; 17α - tetrahydropyranyloxy - 18-methyl-14β-estr-4-en-3-one and 17α - tetrahydropyranyloxy-14β-estr-4-en-3-one, there are respectively obtained according to the foregoing procedure, 3β,17α-dihydroxy-17β-ethynyl-14β-estr-4-ene; 3β - hydroxy - 17α - tetrahydropyranyloxy-18-methyl-14β-estr-4-ene; and 3β - hydroxy-17α-tetrahydropyranyloxy-14β-estr-4-ene.

*Example 13*

A mixture of 1 g. of 3β,17α-dihydroxy-17β-ethynyl-18-methyl-14β-estr-4-ene 4 ml. of pyridine and 2 ml. of acetic anhydride is allowed to stand at room temperature for 15 hours. The mixture is then poured into ice water and the solid which forms is collected by filtration, washed with water and dried to yield 3β-acetoxy-17α-hydroxy-17β-ethynyl-18-methyl-14β-estr-4-ene which may be further purified through recrystallization from acetone:hexane.

3β-acetoxy - 17α - hydroxy - 17β - ethynyl-14β-estr-4-ene is obtained in a similar fashion from the corresponding 3β-hydroxy compound.

*Example 14*

By treating 3β-hydroxy - 17α - tetrahydropyranyloxy-18-methyl-14β-estr-4-ene according to the procedure of Example 13, utilizing hexanoic acid anhydride in place of acetic anhydride, there is obtained 3β - hexanoyloxy - 17α-tetrahydropyranyloxy-18-methyl-14β-estr-4-ene.

3β - hexanoyloxy-17α-tetrahydropyranyloxy - 14β - estr-4-ene is obtained in an analogous fashion.

Example 15

One gram of 3β-hexanoyloxy-17β-tetrahydropyranyloxy-18 - methyl - 14β - estr-4-ene is allowed to stand in methanolic hydrogen chloride for one hour at room temperature. At the end of this time the mixture is poured into ice water and solid which forms is collected by filtration, washed well with water and dried to yield 3β - hexanoyloxy-17α-hydroxy-18-methyl-14β-estr-4-ene which may be further purified through recrystallization from acetone hexane.

3β-hexanoyloxy-17α-hydroxy-14β-estr-4-ene is obtained in a similar fashion from its corresponding 17α-tetrahydropyranyl ether.

What is claimed is:

1. Compounds of the formula:

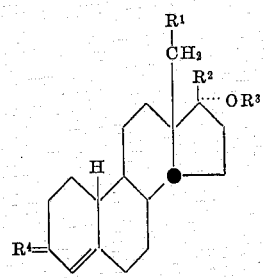

wherein
- R¹ is hydrogen or methyl;
- R² is (lower)alkyl, (lower)alkenyl, (lower)alkynyl, halo(lower)alkynyl or cyclopropyl;
- R³ is hydrogen, tetrahydropyranyl or a hydrocarbon carboxylic acyl group of less than 12 carbon atoms; and
- R⁴ is an oxygen atom or the group

in which R⁵ is hydrogen, tetrahydropyranyl or a hydrocarbon carboxylic acyl group of less than 12 carbon atoms.

2. 14β-estr-4-enes according to claim 1 wherein R⁴ is an oxygen atom and R¹, R² and R³ are as therein defined.

3. 14β-estr-4-enes according to claim 2 wherein R¹ is hydrogen.

4. 14β-estr-4-enes according to claim 2 wherein R¹ is methyl.

5. The 14β-estr-4-ene according to claim 2 wherein R¹ is hydrogen, R² is ethyl and R³ is hydrogen.

6. The 14β-estr-4-ene according to claim 2 wherein, R¹ is hydrogen, R² is ethynyl and R³ is hydrogen.

7. The 14β-estr-4-ene according to claim 2 wherein R¹ is hydrogen, R² is chloroethynyl and R³ is hydrogen.

8. The 14β-estr-4-ene according to claim 2 wherein R¹ is methyl, R² is ethyl and R³ is hydrogen.

9. The 14β-estr-4-ene according to claim 2 wherein R¹ is methyl, R² is ethynyl and R³ is hydrogen.

10. The 14β-estr-4-ene according to claim 2 wherein R¹ is methyl, R² is chloroethynyl and R³ is hydrogen.

11. 14β-estr-4-enes according to claim 2 wherein R¹ is hydrogen and R³ is a hydrocarbon carboxylic acyl group of less than 12 carbon atoms.

12. 14β-estr-4-enes according to claim 2 wherein R¹ is methyl and R³ is a hydrocarbon carboxylic acyl group of less than 12 carbon atoms.

13. 17α-adamantoyloxy-14β-estr-4-en-3-one.

14. 17α-adamantoyloxy-18-methyl-14β-estr-4-en-3-one.

References Cited

UNITED STATES PATENTS

| | | | |
|---|---|---|---|
| 2,846,451 | 8/1958 | Sondheimer et al. | 260—397.3 |
| 3,189,528 | 6/1965 | Smith et al. | 195—51 |
| 3,261,852 | 7/1966 | Rapala | 260—397.4 |

FOREIGN PATENTS

| | | |
|---|---|---|
| 674,299 | 6/1952 | Great Britain. |

OTHER REFERENCES

Fried et al., J. Amer. Chem. Soc., 83, 4663 and 4664 (1961).

Edgren et al., Steroids, 2, 319–335 (1963), pp. 314, 320, 321 and 329 relied on.

LEWIS GOTTS, *Primary Examiner.*

T. MESHBESHER, *Assistant Examiner.*